No. 675,475.  
J. B. GLOVER.  
CULINARY MIXING UTENSIL.  
(Application filed Oct. 8, 1900.)  
(No Model.)
Patented June 4, 1901.
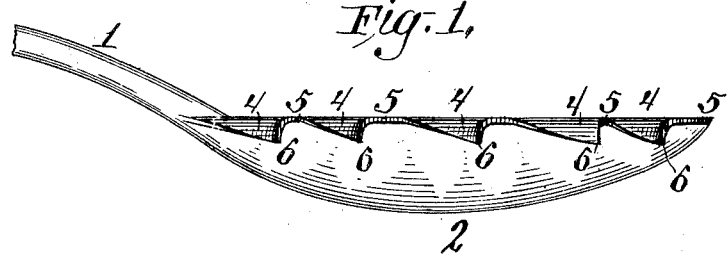
Fig. 1.
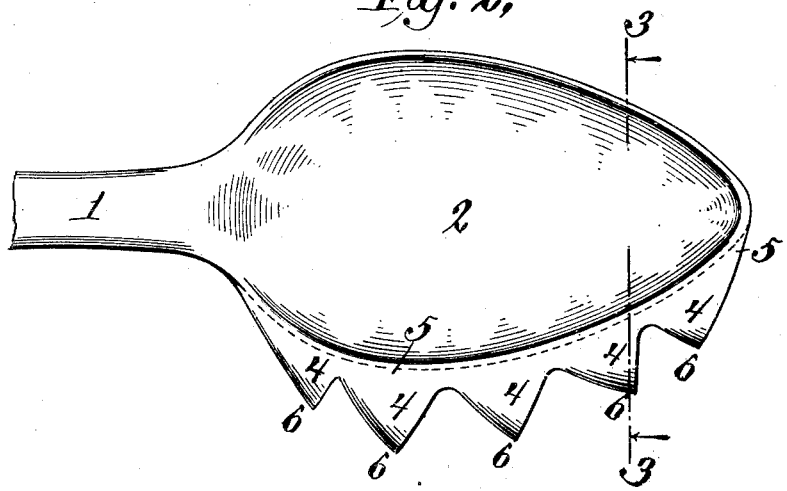
Fig. 2.
Fig. 3.
WITNESSES:  
O. N. Nayport  
Joseph N. Tolwell, Jr.
INVENTOR  
Julia B. Glover  
BY  
Henry D. Williams  
ATTORNEY
THE NORRIS PETERS CO., PHOTO-LITHO., WASHINGTON, D. C.

UNITED STATES PATENT OFFICE.

JULIA B. GLOVER, OF ARDSLEY, NEW YORK.

CULINARY MIXING UTENSIL.

SPECIFICATION forming part of Letters Patent No. 675,475, dated June 4, 1901.

Application filed October 8, 1900. Serial No. 32,376. (No model.)

*To all whom it may concern:*

Be it known that I, JULIA B. GLOVER, a citizen of the United States, and a resident of Ardsley, Westchester county, State of New York, have invented certain new and useful Improvements in Culinary Mixing Utensils, of which the following is a specification, reference being had to the accompanying drawings, forming part thereof.

This invention relates to culinary mixing utensils, and has for its objects the provision of a utensil for the rapid and effectual mixing together of flour and lard or butter or of other substances or materials in the mixing and making of pastry and other articles, and the utensil embodying my invention saves time and labor and is also cleanly, as it does away with the necessity of using the hands or any part which comes in contact with the hands in such mixing operations.

The nature and objects of my invention will more fully appear in the following full description of the embodiment of my invention shown in the accompanying drawings.

Figure 1 is a side elevation of such a utensil with the handle part broken away. Fig. 2 is a plan view of the same. Fig. 3 is a transverse section taken on the line 3 3, Fig. 2.

The utensil shown in the drawings resembles a pastry-spoon so far as the handle 1 and bowl 2 are concerned, and the handle 1 is not completely shown, since it forms no part of my invention.

According to my invention the utensil is provided with outwardly-projecting mixing-teeth, and it is also a feature of my invention that these mixing-teeth are combined with a spoon-shaped bowl, so that the operation of putting together the constituents of a mixture and of mixing and stirring may all be performed with the one utensil.

My invention also includes the provision of a rim on one side of the spoon-shaped bowl and the location of the mixing-teeth so as to project from this rim and includes the provision of lips on the sides of the mixing-teeth. As shown in the drawings, these mixing-teeth 4 extend outwardly from the rim 5 and have lips 6 thereon. The rim 5 is at the front side of the spoon-shaped bowl 2, with its upper surface in the plane of the top of the bowl, and the teeth 4 extend outwardly from this rim in the same plane; but the lips 6 curve downwardly from this plane into a position at an angle to the teeth. The teeth 4 taper outwardly and terminate in points at various distances from the longitudinal center line of the bowl, and the lips 6 taper inwardly—*i. e.*, as they approach the roots of the teeth—disappearing at or near the roots. The teeth 4 have each a lip on one side thereof and on that side thereof nearer the handle end of the utensil. The effect of this construction and arrangement of mixing-teeth is to provide a plurality of projections adapted to enter the material to be mixed at different depths and to cut up and move about and push aside and elevate and depress the materials to be mixed in such a manner as to bring about a rapid and satisfactory mixing thereof.

In the use of the mixing utensil the ordinary functions of a spoon may be performed, and the spoon-shaped bowl may be used for measuring and putting together the materials to be mixed as well as for stirring them during the mixing operation. When flour and butter or lard are to be mixed, the flour is placed on top of the butter or lard and then the utensil is held with the face of the teeth in vertical or nearly vertical position and pressed into and drawn over the materials toward the left or with the convex face of the bowl forward, and a succession of movements of this character, varied by occasional stirring or such other movements as may be necessary, quickly brings about the desired admixture of the materials without the contact with the materials of the hands of the operator or any part of the utensil which comes in contact with the hands of the operator.

It is evident that modifications may be made in the construction shown and above particularly described within the purview of my invention.

What I claim, and desire to secure by Letters Patent, is—

1. A culinary mixing utensil having outwardly-projecting mixing-teeth, such teeth having lips extending from the sides of the teeth, substantially as set forth.

2. A culinary mixing utensil having outwardly-projecting mixing-teeth tapering outwardly, such teeth having lips extending from the sides of the teeth and tapering inwardly, substantially as set forth.

3. A culinary mixing utensil having a spoon-shaped unperforated bowl plain on one side thereof and provided on the other side thereof with outwardly-projecting mixing-teeth extending outwardly from beyond the edge of the bowl substantially in the plane of the top of the bowl, substantially as set forth.

4. A culinary mixing utensil having a spoon-shaped bowl and outwardly-projecting mixing-teeth, such teeth having lips extending from the sides of the teeth, substantially as set forth.

5. A culinary mixing utensil having a spoon-shaped bowl, and outwardly-projecting mixing-teeth tapering outwardly, such teeth having lips extending from the sides of the teeth and tapering inwardly, substantially as set forth.

6. A culinary mixing utensil having a spoon-shaped bowl, a rim on one side thereof and mixing-teeth projecting outwardly from the rim, such teeth having lips extending from the sides of the teeth, substantially as set forth.

7. A culinary mixing utensil having a spoon-shaped bowl, a rim on one side thereof and outwardly-tapering mixing-teeth projecting outwardly from the rim, such teeth having lips extending from the sides of the teeth and tapering inwardly, substantially as set forth.

8. A culinary mixing utensil having a plurality of outwardly-projecting mixing-teeth, each provided with an inwardly-tapering lip curving away from the tooth on one side thereof into a position at an angle thereto, substantially as set forth.

9. A culinary mixing utensil having a spoon-shaped bowl and a plurality of outwardly-projecting mixing-teeth tapering outwardly, each such tooth being provided with an inwardly-tapering lip curving away from the tooth on one side thereof into a position at an angle thereto, substantially as set forth.

10. A culinary mixing utensil having a plurality of outwardly-projecting mixing-teeth, each of such teeth having a lip thereon, such lip curving away from the tooth on one side thereof into a position at an angle thereto, and the lips of the respective teeth being upon the sides thereof nearer the handle end of the utensil, substantially as set forth.

11. A culinary mixing utensil having a spoon-shaped bowl, a rim on one side thereof, and a plurality of outwardly-projecting mixing-teeth tapering outwardly, each of such teeth having an inwardly-tapering lip curving away from the tooth on one side thereof into a position at an angle thereto, and the lips of the respective teeth being upon the sides thereof nearer the handle end of the utensil, substantially as set forth.

Signed at the borough of Manhattan, in the county of New York, city of New York, and State of New York, this 3d day of October, A. D. 1900.

JULIA B. GLOVER.

Witnesses:
EDWARD S. LETTS,
HENRY D. WILLIAMS.